US012809314B2

(12) United States Patent
Born et al.

(10) Patent No.: US 12,809,314 B2
(45) Date of Patent: Nov. 24, 2026

(54) SPEED-REGULATING DEVICE FOR A ROTATING WHEEL SET OF A TIMEPIECE

(71) Applicant: The Swatch Group Research and Development Ltd, Marin (CH)

(72) Inventors: Jean-Jacques Born, Morges (CH); Pierpasquale Tortora, Neuchâtel (CH); Baptiste Hinaux, Lausanne (CH); Cédric Nicolas, Neuchâtel (CH)

(73) Assignee: The Swatch Group Research and Development Ltd, Marin (CH)

(*) Notice: Subject to any disclaimer, the term of this patent is extended or adjusted under 35 U.S.C. 154(b) by 267 days.

(21) Appl. No.: 18/606,399

(22) Filed: Mar. 15, 2024

(65) Prior Publication Data

US 2024/0337984 A1 Oct. 10, 2024

(30) Foreign Application Priority Data

Apr. 6, 2023 (EP) .................................... 23167065

(51) Int. Cl.
*G04B 17/30* (2006.01)
*G04B 19/30* (2006.01)

(52) U.S. Cl.
CPC ............. *G04B 17/30* (2013.01); *G04B 19/30* (2013.01)

(58) Field of Classification Search
None
See application file for complete search history.

(56) References Cited

U.S. PATENT DOCUMENTS

| | | | | |
|---|---|---|---|---|
| 6,367,966 B1 * | 4/2002 | Hara | ........................ | G04B 1/10 368/204 |
| 10,254,715 B2 * | 4/2019 | Peters | .................... | H05B 45/42 |
| 2021/0191337 A1 | 6/2021 | Favre et al. | | |

FOREIGN PATENT DOCUMENTS

| | | |
|---|---|---|
| EP | 3 838 424 A1 | 6/2021 |
| JP | H11-055976 A | 2/1999 |
| JP | 2021-99307 A | 7/2021 |

OTHER PUBLICATIONS

European Search Report for EP 23 16 7065 dated Sep. 4, 2023.

* cited by examiner

*Primary Examiner* — Renee S Luebke
*Assistant Examiner* — Michael James Walker
(74) *Attorney, Agent, or Firm* — Sughrue Mion, PLLC

(57) ABSTRACT

A timepiece with, in order to regulate the speed of rotation of a rotating wheel set, a regulating device including a microgenerator and an LED powered by the microgenerator without storage of electrical energy and arranged such that, for a range of functional speeds of the rotating wheel set, the corresponding range of frequencies of rotation of the rotor of the microgenerator generates, in its coils, an induced voltage range whose maximum voltage value for the maximum frequency is greater than a threshold voltage, preferably also the minimum voltage value for the minimum frequency, the motor device which drives the rotating wheel set being arranged to have a useful motor torque range allowing the rotating wheel set to be driven within the functional speed range. Also a related method.

31 Claims, 8 Drawing Sheets

SPEED-REGULATING DEVICE FOR A ROTATING WHEEL SET OF A TIMEPIECE

CROSS REFERENCE TO RELATED APPLICATION

This application claims priority to European Patent Application No. 23167065.4 filed Apr. 6, 2023, the entire contents of which are incorporated herein by reference.

TECHNICAL FIELD OF THE INVENTION

The invention relates to a timepiece comprising a rotating wheel set, a motor device arranged to be able to drive this rotating wheel set, a regulating device for regulating the speed of rotation of the rotating wheel set, this regulating device including a microgenerator which includes a stator and a rotor mechanically coupled to the rotating wheel set, the stator carrying permanent magnets or coils and the rotor carrying coils or permanent magnets respectively.

The invention further relates to a method for regulating the speed of rotation of a rotating wheel set of a timepiece, in a functional speed range of the rotating wheel set between a minimum speed and a maximum speed that is strictly greater than the minimum speed, the rotating wheel set being driven by a motor device included in the timepiece, which method allows a device for regulating the speed of rotation of the rotating wheel set to be implemented, this regulating device including a microgenerator which includes a rotor mechanically coupled to the rotating wheel set, this rotor being movable about an axis of rotation relative to a stator carrying permanent magnets or coils, the rotor carrying coils or permanent magnets respectively, the coils being connected, directly or indirectly, to at least one light-emitting diode.

The invention relates to the field of timepieces, more particularly to watches, and even more particularly to watches comprising a mechanical energy source, of the type including an ancillary mechanism not dedicated to time measurement but typically dedicated to sound or visual display functions, for example for striking or visually animated watches, or music boxes, this mechanism comprising at least one rotating wheel set. The invention more particularly relates to the field of regulating the speed of such a rotating wheel set, which is typically actuated by a spring whose discharge causes the speed of the rotating wheel set to vary significantly in the absence of a regulating mechanism.

TECHNOLOGICAL BACKGROUND

Regulating the speed of horological wheel sets is an old problem, originally linked to regulating the ringing of bells. Older solutions were purely mechanical, based on variations in the inertia of the wheel set, with ball governors for example, or on braking by air friction, but such solutions, which could be applied to clocks or pendulums, could not be applied to watches.

The limited space available in a watch case has led to the development of new solutions, such as electromagnetic or eddy current governors. These solutions are functional, but expensive and reserved for luxury products; some of their components are very delicate and require special maintenance.

The European patent document EP3838424 filed by The Swatch Group Research & Development Ltd describes a musical or striking mechanism for a timepiece or music box, comprising an energy source outputting a mechanical torque and means for transmitting mechanical torque from the energy source to a wheel set generating music or chimes. The mechanism further comprises a wheelset governor. The governor is configured to regulate, about a reference speed value, the speed at which the wheel set pivots about a pivot axis, and includes means for braking the wheel set, which means are configured to bring the pivoting speed of the wheel set back to the reference speed. The wheel set governor consists of a system comprising a microgenerator, also referred to as a “generator”, a rotor of which is mechanically connected to the energy source outputting the mechanical torque, and an electronic circuit for regulating the rotation frequency of the microgenerator. This circuit regulates the frequency electronically in the same way as in watches with a generator indicating the time, i.e. using rotor revolution counting technology, which requires an electronic time base, to compare the rotation frequency with a time base, and acting on a transistor which regulates the current flow in the coils with short-circuit braking pulses. In short, an electronic braking circuit controls the generation of braking pulses.

The use of electronic or electrical circuits presents major drawbacks for a watch fitted with a mechanical movement, particularly for a top-of-the-range watch for which it is important to retain the mechanical character of the watch as far as possible. Indeed, these known systems are equipped with an electronic circuit with various electronic elements arranged on an electrical circuit (typically a PCB) located at the periphery of the microgenerator, which introduces a relatively extensive electronic device into the watch. All of these stationary electrical and electronic parts thus occupy a relatively large surface area, over and above the surface area delimited by the microgenerator, and this assembly is typically visible, which accentuates the hybrid nature of the watch for the consumer.

SUMMARY OF THE INVENTION

The invention aims to solve in particular the problems of the prior art indicated above. Other objectives will also be apparent from the following description of the invention.

To this end, the invention relates to a timepiece according to claim 1, which comprises a rotating wheel set, a motor device arranged so as to be able to drive this rotating wheel set, and a regulating device for regulating the speed of rotation of the rotating wheel set, this regulating device including a microgenerator which includes a stator and a rotor mechanically coupled to the rotating wheel set, and at least one light-emitting diode which is powered, directly or indirectly, by the microgenerator.

The invention further relates to a method for regulating the speed of rotation of a rotating wheel set of a timepiece, in a functional speed range of the rotating wheel set between a minimum speed and a maximum speed that is strictly greater than the minimum speed, according to claim 25.

BRIEF DESCRIPTION OF THE FIGURES

The aims, advantages and features of the invention will become clearer from the detailed description that follows, and with reference to the accompanying drawings, in which.

DETAILED DESCRIPTION OF THE INVENTION

Figure 1:
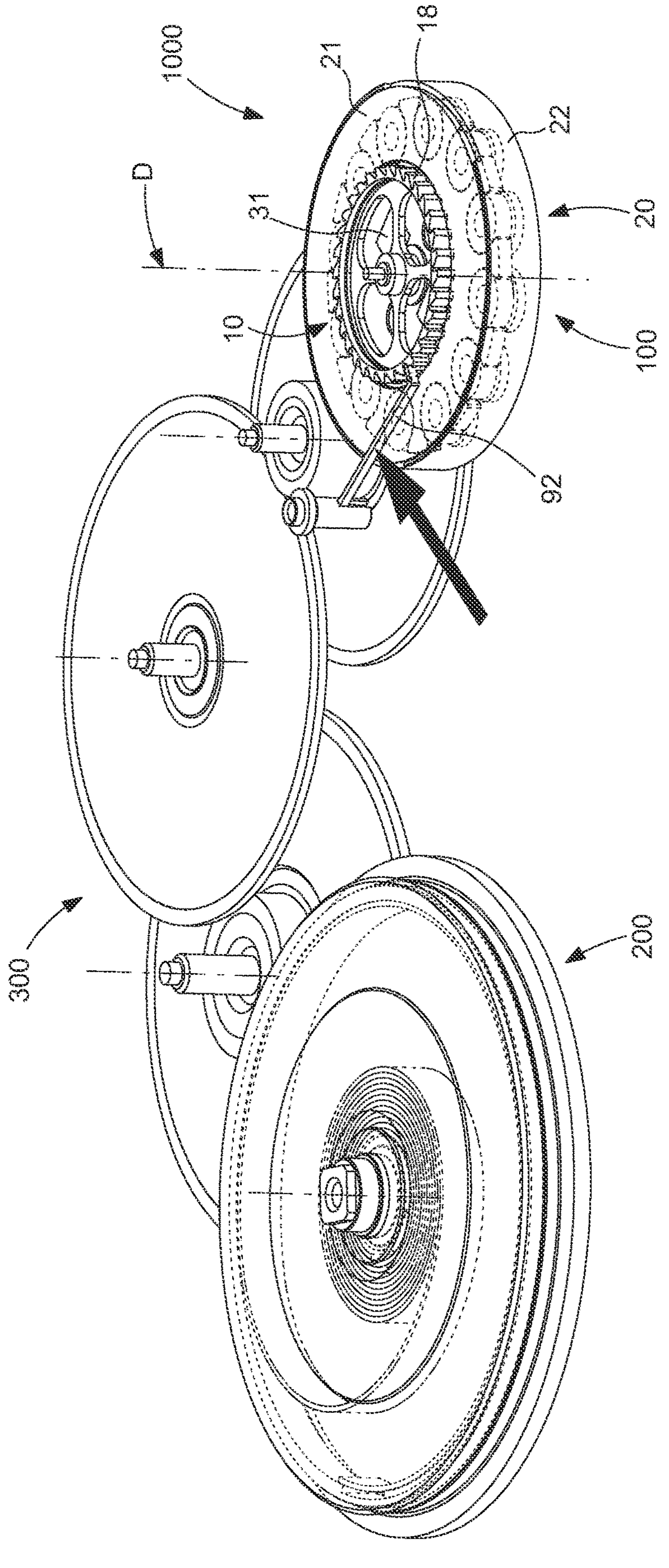
FIG. 1 shows a perspective view of an example application of the invention to a watch including an illumination device: on the left-hand side of the figure, a barrel can be seen, which barrel powers a microgenerator via a gear train, which microgenerator includes a rotor that can rotate relative to a stator; the microgenerator carries at least one light-emitting diode that is powered by at least one coil and that is mounted on the rotor, eccentrically relative to the axis of rotation of the rotor, whereas the stator carries permanent magnets; this rotor carries a ratchet, which cooperates with a click to allow or prevent the rotation thereof; the arrow diagrammatically indicates a device for actuating the click which can rotate in order to stop and release the generator.
Figure 2B:
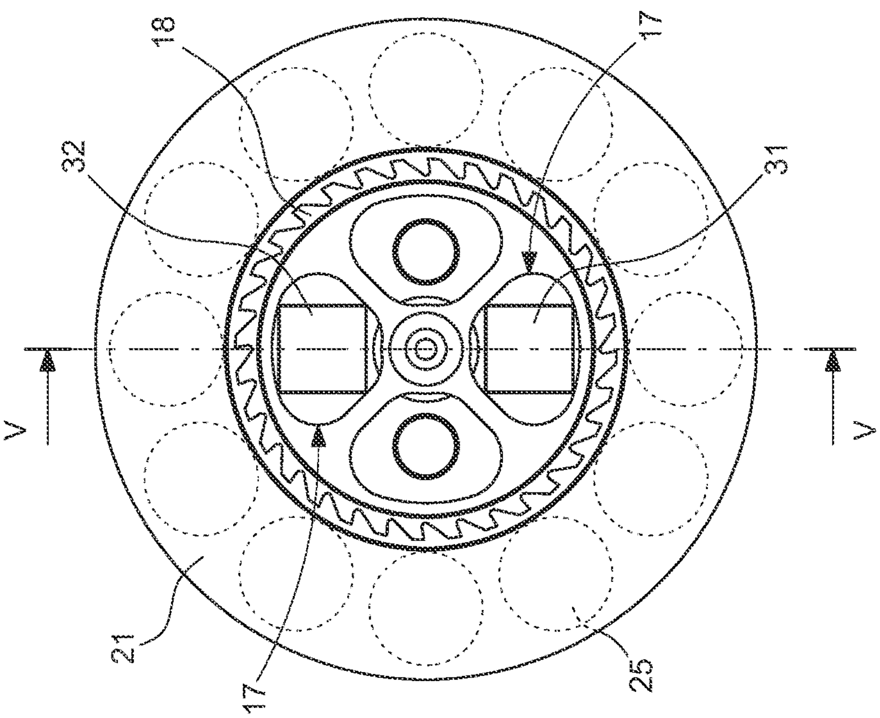
FIG. 2B is a top view of the microgenerator in FIG. 1.
Figure 2A:
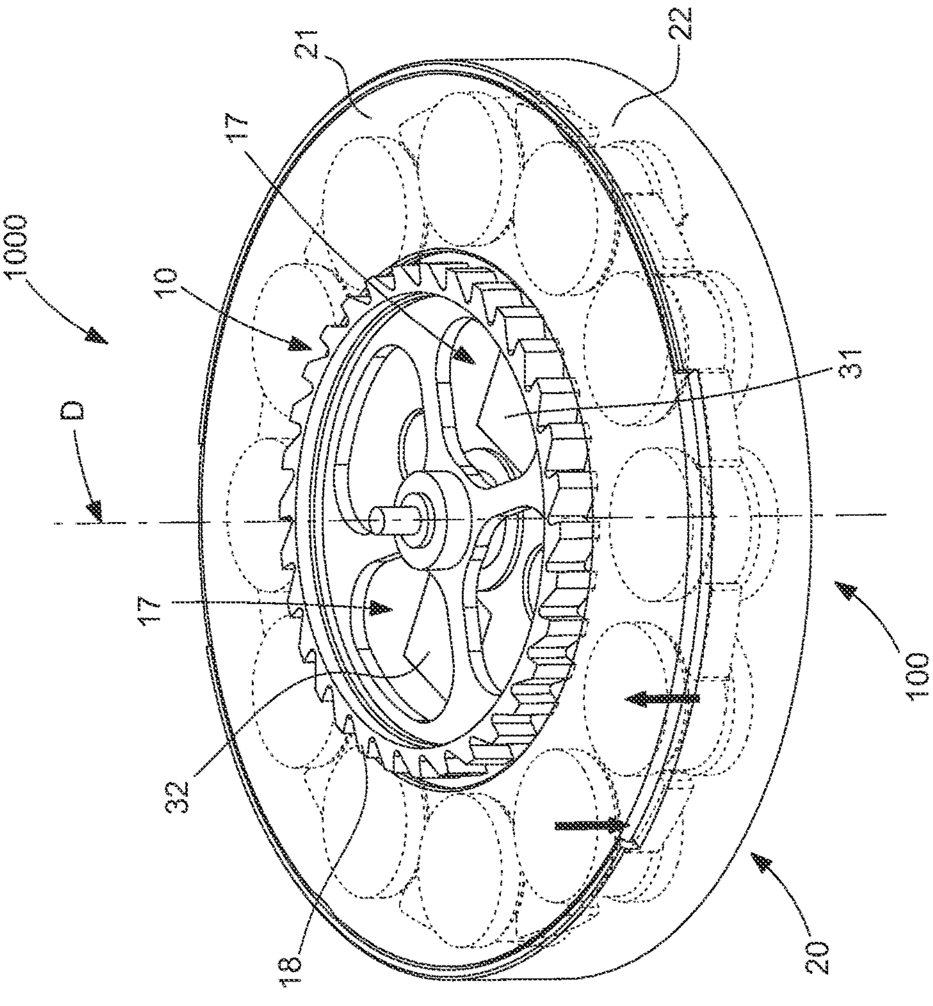
FIG. 2A is a perspective view of the microgenerator shown in FIG. 1, in which the two rings of the stator carry permanent magnets of alternating polarity, and the rotor carries coils in their air gap; the arrows show the alternating directions of the magnetic field, in the same direction parallel to the axis of rotation of the rotor; the rotor carries two light-emitting diodes mounted symmetrically relative to this axis of rotation, and both eccentric.

The invention proposes using a microgenerator powering at least one light-emitting diode to consume part of the energy supplied by a motor device to a rotating wheel set, in order to regulate the speed of this rotating wheel set.

The invention relates to a timepiece 2000 comprising a rotating wheel set 1, a motor device arranged to be able to drive this rotating wheel set 1, and a regulating device 1000 for regulating the speed of rotation of the rotating wheel set 1. This motor device is in particular a mechanical motor device, in particular formed by a barrel 200.

The regulating device 1000 includes a microgenerator 100 of the horological type, which includes a stator 20 and a rotor 10 which is mechanically coupled to the rotating wheel set 1, and at least one light-emitting diode 31, 32, (hereinafter also referred to as an 'LED'), which is powered, directly or indirectly, by the microgenerator 100, and more particularly by at least one coil included in the microgenerator 100. Generally speaking, the stator carries permanent magnets 25 or coils, and the rotor carries coils 11 or permanent magnets respectively. A distinction is made hereinafter between the "speed" of rotation of the rotating wheel set 1 and the "frequency" of rotation of the rotor 10. Each coil 11 powers said at least one light-emitting diode 31, 32 with an electric current induced when the rotor 10 rotates relative to the stator 20.

FIGS. 1 to 5 illustrate a non-limiting example of a microgenerator 100 with a rotor 10 including coils 11, in particular flat coils (wafers), and a stator 20 comprising an annular base 21, having an L-shaped radial section, carrying a first part of the permanent magnets 25, and an annular flange 22 closing the annular base and carrying a second part of the permanent magnets 25. The annular base and the annular flange form a stator cage having a C-shaped radial section with three straight portions. The diameter of the microgenerator 100 is typically between 6 mm and 15 mm.

The annular base 21 and the flange 22 are preferably made of a ferromagnetic material forming an external closure for the magnetic field of the permanent magnets 25, which are axially magnetised and arranged on the inside of the stator cage, facing the coils 11 of the rotor 10. More generally, the coils 11 and the permanent magnets 25 are arranged so that the coils pass at least partially over the permanent magnets when the rotor 10 rotates and is driven either directly or indirectly by a barrel 200 included in the motor device, or by any suitable drive means. This thus gives a microgenerator 100 of the type with axial magnetisation of the permanent magnets 25 and a "three-level" structure with the rotor 10 carrying the coils 11 placed in the intermediate level, in the space between two levels of permanent magnets 25 located respectively on the two axial sides of the coils 11. The magnets 25 axially opposite each other have the same polarity, and two adjacent magnets on the same level have opposite magnetic polarities. Thus, conventionally, for each of the two levels of magnets, the polarities alternate.

Figure 4:
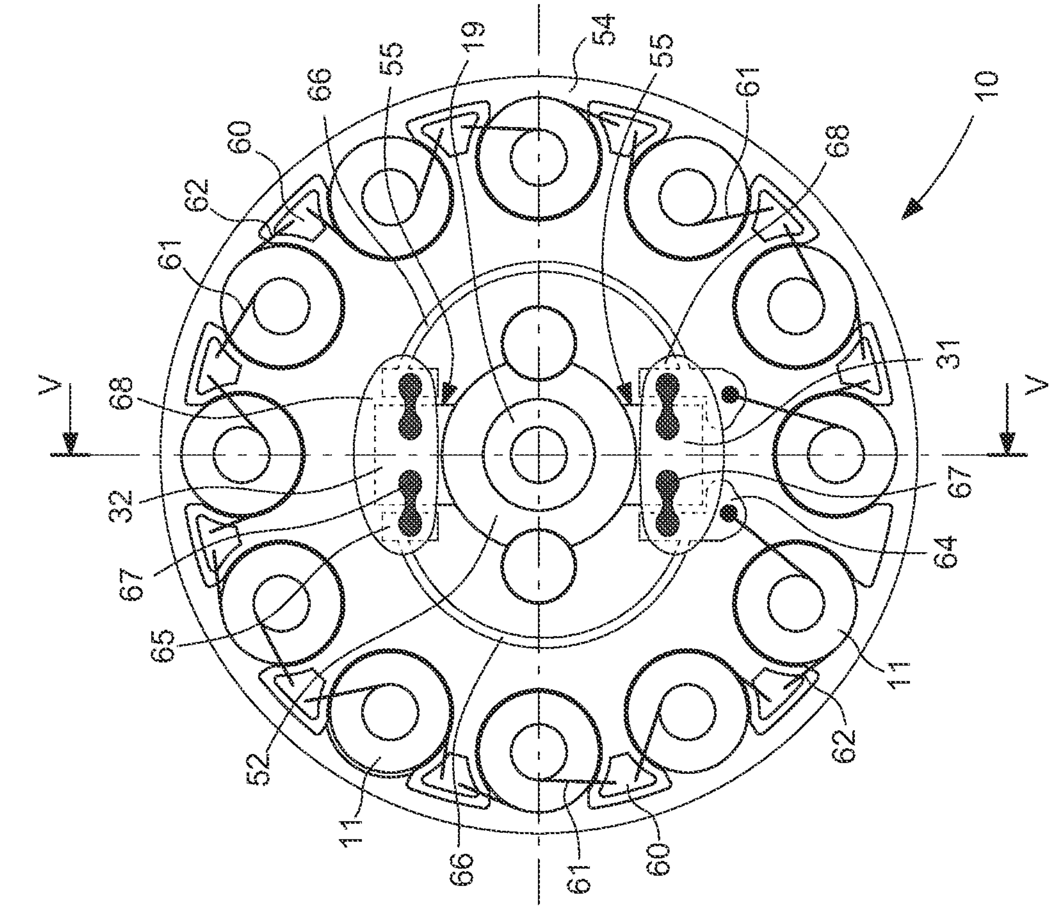
FIG. 4 shows a top view, taken in the direction of the axis of rotation, of the rotor of the microgenerator in FIGS. 1 to 3; it shows the connection configuration between the coils, and between the coils and the light-emitting diodes, which are all carried by the rotor.
Figure 3:
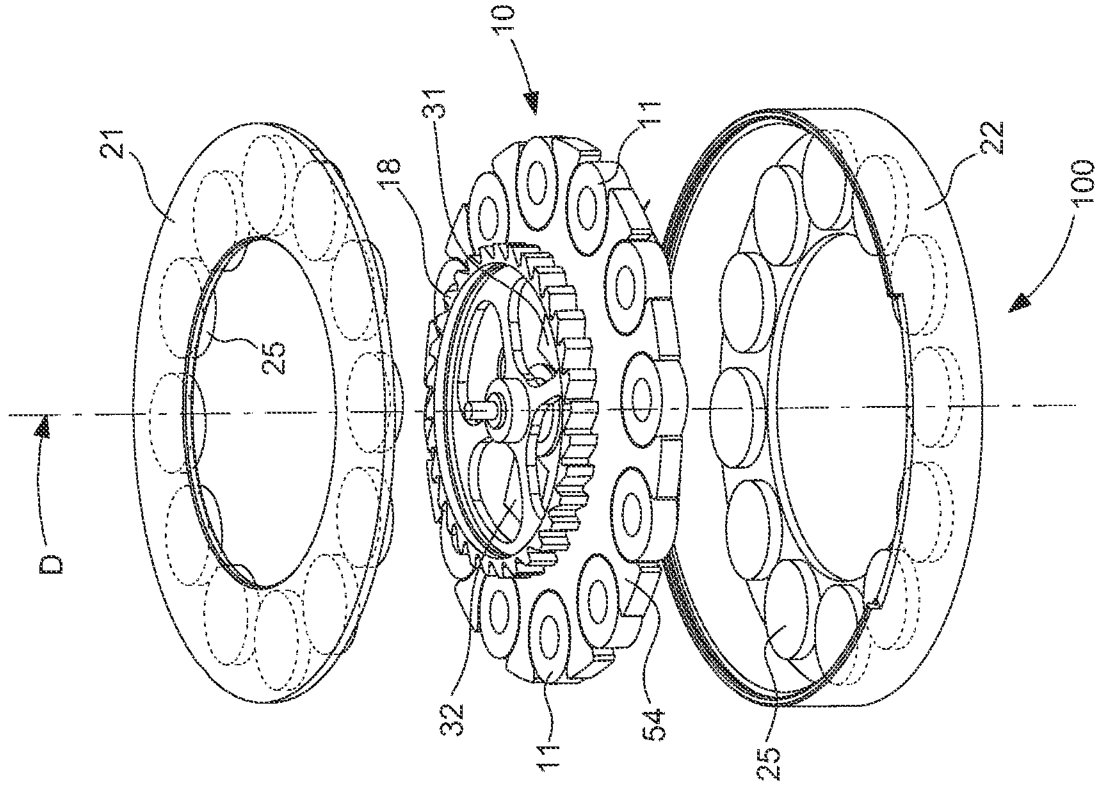
FIG. 3 is an exploded, perspective view of the microgenerator shown in FIGS. 1, 2A and 2B; the rotor disc here carries 12 coils, and the double row of 12 magnets in the stator rings can be seen.

In a preferred alternative embodiment, and as shown in FIG. 4, at least one light-emitting diode 31, respectively 32, is powered directly by at least one coil 11 as it rotates relative to the stator 20 of the microgenerator 100, without any electrical and/or electronic circuit between said at least one light-emitting diode and said at least one coil, with the exception of contact pads and two circular tracks, for example made of gold, in particular without any capacitor and/or other electrical and/or electronic components.

According to the preferred alternative embodiment of the invention, the at least one light-emitting diode 31, 32 forms, together with the microgenerator 100, the regulating device 1000.

In the case of the at least one light-emitting diode 31, 32 being powered indirectly by the microgenerator 100, the at least one light-emitting diode 31, 32 is connected to the microgenerator 100 via an electrical and/or electronic circuit without any substantial electrical energy storage component. According to this advantageous alternative embodiment of the invention, the at least one light-emitting diode 31, 32, the electrical and/or electronic circuit, without any substantial electrical energy storage component, and the microgenerator 100 together form the regulating device.

The microgenerator 100 and the at least one light-emitting diode 31, 32 are arranged so that, for a functional speed range of the rotating wheel set 1 between a minimum speed $V_{min}$ and a maximum speed $V_{max}$ that is strictly greater than the minimum speed $V_{min}$, the corresponding frequency range of the rotation of the rotor 10, comprised between a minimum frequency $F_{min}$ and a maximum frequency $F_{max}$, generates, in the coils 11, an induced voltage range whose maximum induced voltage value (peak voltage) $U_{max}$, occurring for the maximum frequency $F_{max}$, is greater than a threshold voltage Us of said at least one light-emitting diode 31, 32. Preferably, the minimum induced voltage (peak voltage) value $U_{min}$, occurring for said minimum frequency $F_{min}$, of the induced voltage range is also greater than the threshold voltage Us of said at least one light-emitting diode 31, 32.

The at least one light-emitting diode 31, 32 and, where appropriate, the aforementioned electrical and/or electronic circuit constitute the only electrical energy-consuming device incorporated in the regulating device 1000, the motor device being arranged in such a way that it has a useful motor torque range allowing the rotating wheel set 1 to be driven substantially within the functional speed range.

Figure 6:
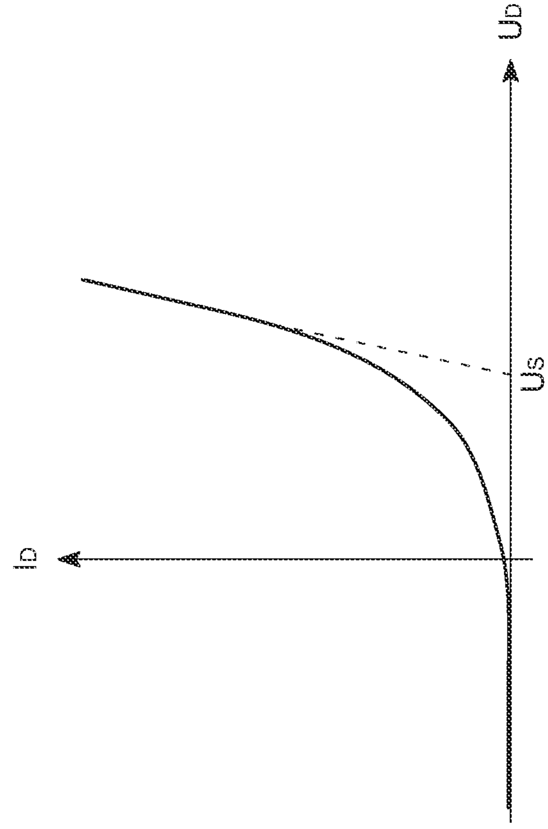
FIG. 6 shows the characteristic curve of the current intensity in a light-emitting diode (ordinate) as a function of the voltage applied across the terminals of this light-emitting diode (abscissa); it can be seen that above a threshold voltage Us, the current intensity increases rapidly in a substantially linear fashion with the voltage.

The combination of these features allows the one or more LEDs 31, 32 to regulate the frequency of rotation of the rotor 10, and thus the speed of rotation of the rotating wheel set 1, for a range of useful mechanical torque supplied by the motor device, and allows the regulating device 1000 to be configured for this purpose, this device being limited to the assembly formed by the one or more LEDs 31, 32, optionally an electrical and/or electronic circuit, without any substantial electrical energy storage component, and the microgenerator 100. The one or more LEDs 31, 32 and the microgenerator 100 are thus arranged so that the voltage induced in the microgenerator 100 remains within an induced voltage range, for the useful mechanical torque range, which corresponds to a working voltage range of each LED 31, 32, on the current/voltage curve characteristic of an LED and shown in FIG. 6.

According to a particular feature, the minimum voltage value $U_{min}$ (peak voltage) of the induced voltage range, corresponding to the minimum frequency $F_{min}$, is also greater than the threshold voltage Us of said at least one light-emitting diode 31, 32. The LEDs thus operate over the entire speed range of the rotating wheel set 1 and thus regulate the speed of rotation of this rotating wheel set over the entire speed range provided for in normal operation for this rotating wheel set.

According to a particular feature, the regulating device does not include any means of dissipating the kinetic energy of the rotor 10 of the microgenerator 100, the aim being to prevent the rotor frequency from increasing rather than lowering it;

According to a particular feature, the motor device is arranged so that its useful motor torque range has a minimum torque $C_{MotMin}$, driving the rotating wheel set 1 at the minimum speed $V_{min}$ of the functional speed range, and a maximum torque $C_{MotMax}$ driving the rotating wheel set 1 at the maximum speed $V_{max}$ of this functional speed range.

Advantageously, the regulating device 1000 regulates the rotation frequency of the rotor 10 by maintaining it in the frequency range between the minimum frequency $F_{min}$ and the maximum frequency $F_{max}$, for the useful torque range of the motor device between the minimum motor torque $C_{MotMin}$ and the maximum motor torque $C_{MotMax}$.

More particularly, the motor device is formed by a barrel 200 which is dedicated to driving a mechanism comprising the rotating wheel set 1 and which is dimensioned so that the useful range of the torque it outputs, between the minimum motor torque $C_{MotMin}$ and the maximum motor torque $C_{MotMax}$, is such that the minimum motor torque $C_{MotMin}$ is equal to the sum of a mechanical torque $C_{MecVmin}$ required to drive the mechanism, with the exception of the rotor 10 of the microgenerator 100, with the rotating wheel set 1 rotating at the minimum speed $V_{min}$, on the one hand, and a minimum rotor drive torque $C_{EDmin}$ corresponding to the minimum frequency $F_{min}$ of the rotor 10, on the other hand, and so that the useful range ($C_{MotMin}$; $C_{MotMax}$) of the torque it outputs is also such that the maximum motor torque $C_{MotMax}$ is equal to the sum of a mechanical torque $C_{MecVmax}$ required to drive the mechanism, with the exception of the rotor 10 of the microgenerator 100, with the rotating wheel set 1 rotating at the maximum speed $V_{max}$, on the one hand, and a maximum rotor drive torque $C_{EDmax}$ corresponding to the maximum frequency $F_{max}$ of the rotor 10, on the other hand. Thus:

$$C_{MotMin} = C_{MecVmin} + C_{EDmin}$$

$$C_{MotMax} = C_{MecVmax} + C_{EDmax}$$

The regulating device 1000 includes one or more light-emitting diodes 31, 32, in such a number that, depending on their type and size, all of the light-emitting diodes 31, 32, included in the regulating device 1000 are arranged to dissipate electrical energy with a drive torque of the rotor 10 between the minimum rotor drive torque $C_{EDmin}$, corresponding to the minimum frequency $F_{min}$ of the rotor 10 on the one hand, and the maximum rotor drive torque $C_{EDmax}$, corresponding to the maximum frequency $F_{max}$ of the rotor 10 on the other hand.

According to two particular alternative embodiments, the coils 11 are connected, directly or indirectly, to the at least one light-emitting diode 31, 32.

According to an advantageous feature, at least one light-emitting diode 31, 32 is powered indirectly, via an electrical or electronic circuit which comprises a Graetz bridge rectifier forming the one and only electrical and/or electronic circuit, by at least one coil 11 supplying an electric current induced during its rotation relative to the stator 20 of the microgenerator 100.

According to advantageous features illustrated by the figures, the stator 20 carries the permanent magnets 25, and the rotor 10 carries the coils 11, and each light-emitting diode 31, 32 is mounted on the rotor 10.

More specifically, the permanent magnets 25 are located, when projected axially, inside a circular surface defined by the rotor 10 when it is rotating.

Preferably, at least one light-emitting diode 31, 32 is powered directly by at least one coil 11 as it rotates relative to the stator 20 of the microgenerator 100.

More particularly, and as can be seen in the advantageous alternative embodiment shown in FIGS. 1 to 5, the rotor 10 carries at least one pair of light-emitting diodes 31, 32, which are preferably diametrically opposed and arranged in reverse polarity to each other.

More particularly, in an alternative embodiment not illustrated, the rotor 10 carries four light-emitting diodes (also referred to as 'LEDs') at 90° from one another, arranged in pairs of reverse polarity (preferably two diametrically opposed LEDs with the same polarity).

According to an advantageous feature, any electrical and/or electronic device included in the timepiece 2000 is a component of the microgenerator 100 and of the regulating device.

Preferably, any electrical and/or electronic equipment included in the timepiece 2000 is mounted on the rotor 10 of the microgenerator 100. This electrical and electronic equipment is formed by said at least one light-emitting diode 31, 32, the one or more coils, and, where appropriate, an electrical and/or electronic circuit arranged between at least one of the coils and said at least one light-emitting diode 31, 32. A mechanical timepiece thus avoids the need for wiring or means for transferring electrical energy outside of the rotor 10.

In particular, and as can be seen in FIGS. 1 to 5, the rotor 10 and the stator 20 are mounted coaxially about an axis of rotation D of the microgenerator 100, and said at least one light-emitting diode 31, 32 is mounted eccentrically relative to said axis of rotation D, each light-emitting diode 31, 32 thus describing an annular surface during the rotation of the rotor 10.

Moreover, in a particular embodiment, said at least one light-emitting diode 31, 32 is arranged to provide at least a major part of the light 70 that it emits to at least one part of the timepiece 1000 visible to a user of this timepiece, so as to illuminate this at least one visible part. Thus, the light-emitting diodes 31, 32 are arranged on the rotor 10 to obtain the best result, and the outer structure on the side from which light is emitted must be perforated to allow the emitted light 70 to pass for the most part through this outer structure, preferably so that substantially all of the emitted light can pass through this outer structure.

Figure 5:
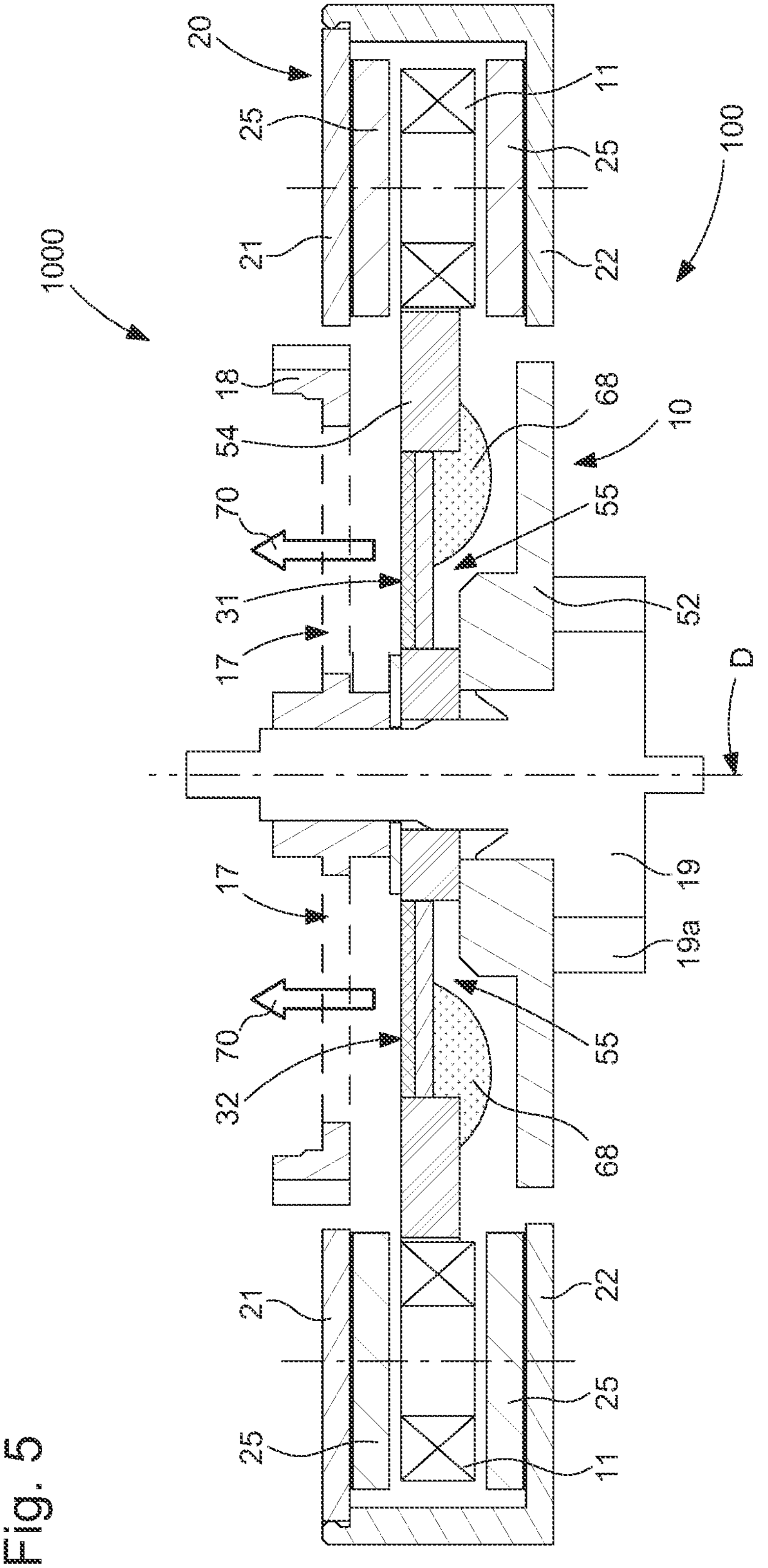
FIG. 5 is a sectional view of the microgenerator in the previous figures, passing through the axis of rotation of the microgenerator; in this particular and non-limiting example, the dimensions of the microgenerator are very small, with a stator cage measuring approximately 8 mm in diameter and approximately 1.4 mm in thickness.

Furthermore and more particularly, as can be seen in FIGS. 4 and 5, the rotor 10 comprises a hub 19 which includes a drive pinion 19*a* and which carries a lower annular structure 52, a disc 54, for example made of ceramic, forming a support for the coils 11 arranged in peripheral openings in this disc and for the two LEDs 31, 32, arranged in two respective openings 55 in the disc, and a toothed wheel 18 located above the emission surfaces of the LEDs 31, 32, which wheel is perforated, and including apertures 17 configured to allow the light 70 emitted by each of these LEDs to pass towards means for guiding this emitted light towards said at least one visible part of the timepiece.

The toothed wheel 18 is a ratchet forming a device for locking and releasing the microgenerator 100. The lower annular structure 52 is preferably opaque and without openings, so as to mask the openings 55, the contact pads 65, the adhesive drops 68 and the circular tracks 66. The contact pads 60 and the connections between the coils 11 and these contact pads are hidden from an observer's view by the base 22 of the stator cage. Thus, apart from a small portion of the two contact pads 64 that may be visible through the circular slot located between the annular structure 52 and the base 22, the microgenerator 100 does not reveal any electrical or electronic elements, with the exception of the LED emission surfaces, which have a noble appearance and are located in an internal region of this light microgenerator. Such a construction is particularly well suited to an illumination device incorporated into a high-end mechanical movement. Moreover, the electrical connections can be made in gold.

More particularly, the regulating device 1000 includes, in the vicinity of the microgenerator 100, at least one stationary light-guiding structure, which is arranged to collect, for any angular position of the rotor 10 when the latter is rotating, at least a major part of the light emitted by at least one light-emitting diode 31, 32, and to then guide this emitted light towards at least one visible part of the timepiece, so as to obtain a substantially constant and/or substantially uniform illumination of this visible part when the at least one light-emitting diode is emitting.

In a particular embodiment, the rotor 10 is driven by a barrel 200, through a barrel gear train 300. The microgenerator 100 is equipped with a device 400 for locking and releasing the rotor, which device comprises the ratchet 18 and a click 92, this device making it possible to activate the microgenerator on demand, in the same manner as for a governor, in particular in a musical or striking watch. It is used to start the rotation of the microgenerator on demand and then to stop it. It is thus possible to briefly activate the rotation of the rotor several times over a barrel charge.

The rotor 10 comprises a module consisting of the support disc 54 (which is in particular made of ceramic material) which carries a certain number of small coils 11 on its periphery as well as at least one light-emitting diode, in particular two LEDs 31, 32. Rotation of the coils 11 in the magnetic field of the magnets 25 of the stator 20 generates an induced voltage and thus an induced alternating current, which powers the light-emitting diodes according to the equivalent wiring diagram shown in FIG. 8. The coils 11 are connected in series, with alternating polarities, the inner end 61 and the outer end 62 of each coil being connected respectively to two contact pads 60 formed on the support disc 54. This plurality of coils is connected to the two LEDs, in particular via a printed circuit board which consists of two contact pads 64 for two respective ends of two end coils of the series of coils and for an electrical connection 67 of the first LED 31 to these coils, two contact pads 65 for the electrical connection 67 of the second LED 32, and two circular tracks 66 connecting the two contact pads 64 respectively to the two contact pads 65. The two LEDs 31, 32 are reverse-biased in order to exploit the alternation of the electric current generated in this system for directly powering the LEDs using the coils 11. In the advantageous alternative embodiment shown, the contact pads 64 and 65 and the two circular tracks 66 are directly printed/deposited on the support disc. This eliminates the need for a conventional PCB made of synthetic material. It should be noted that the electrical connections 67 are protected by drops of adhesive 68 which further serve to fasten the LEDs within the respective openings 55 in the support disc 54.

Figure 8:
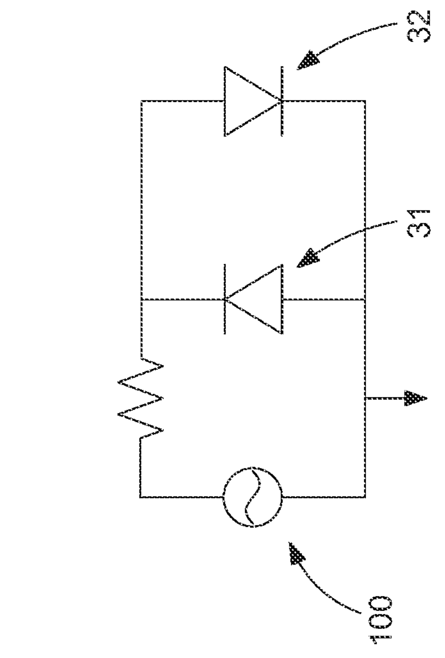
FIG. 8 diagrammatically shows an equivalent electrical circuit for a preferred alternative embodiment of the proposed regulating device, with a microgenerator, generating an alternating signal and which is connected in parallel with two light-emitting diodes with reversed polarity. Thus, during the alternation of the signal, one or the other of the diodes will emit light. For frequencies above 30 Hz, the eye can no longer distinguish this alternation and perceives both diodes as being lit at the same time.

An electrical circuit as simple as the one shown in FIG. 8 can thus be used.

Figure 9:
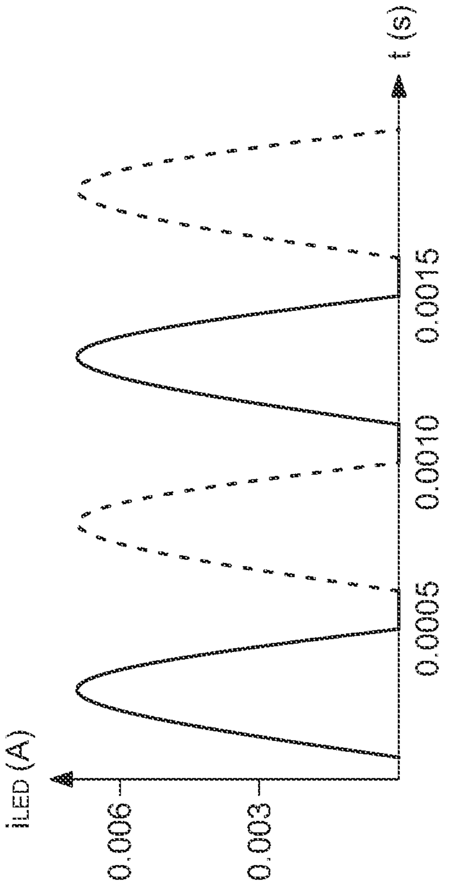
FIG. 9 shows the shape of the induced current (ordinate) in the light-emitting diodes, as a function of time (abscissa), for a frequency of 150 Hz; the solid line curve corresponds to a first LED, and the broken curve to a second LED connected in parallel with the first LED, in direct connection with it and arranged in reverse polarity to the first LED.

The current $i_{LED}$ flowing through each light-emitting diode 31, 32 over time then takes the form shown in FIG. 9.

Figure 10:
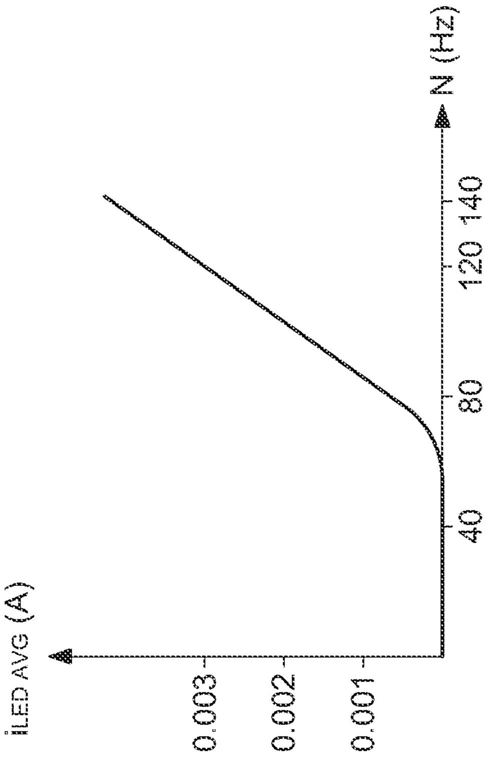
FIG. 10 shows the shape of the average current (ordinate) flowing through the two light-emitting diodes as a function of the rotation frequency of the rotor (abscissa)
Figure 11:
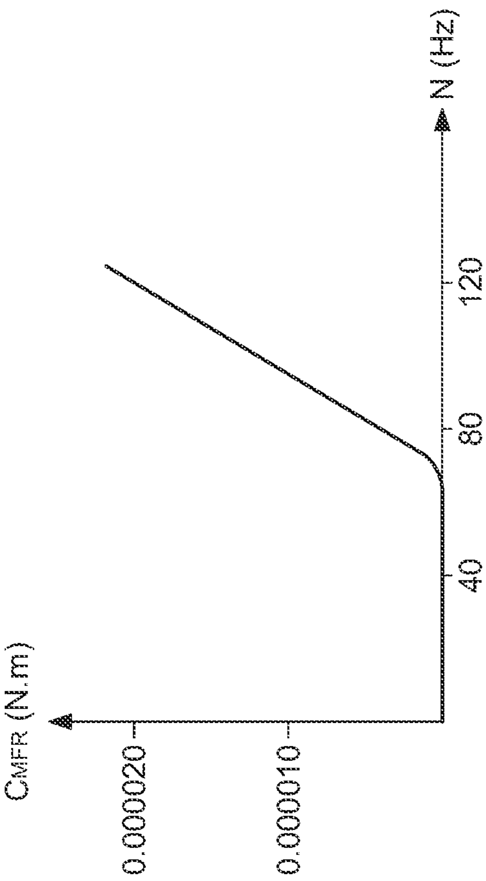
FIG. 11 shows the shape of the average braking torque applied to the rotor (ordinate) by the two light-emitting diodes as a function of the rotation frequency of the rotor (abscissa)
Figure 12:
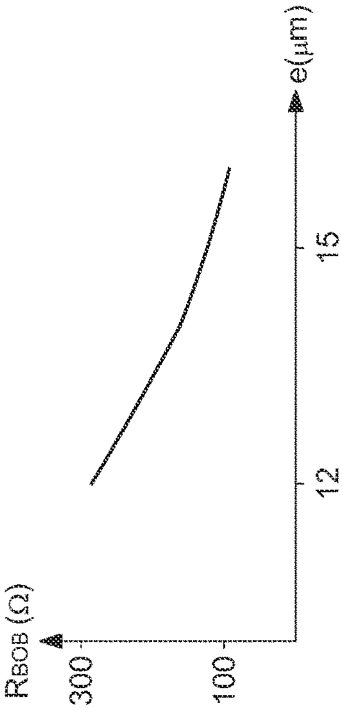
FIG. 12 is a curve showing the influence of the thickness of the coil wire (abscissa) on coil resistance (ordinate)
Figure 13:
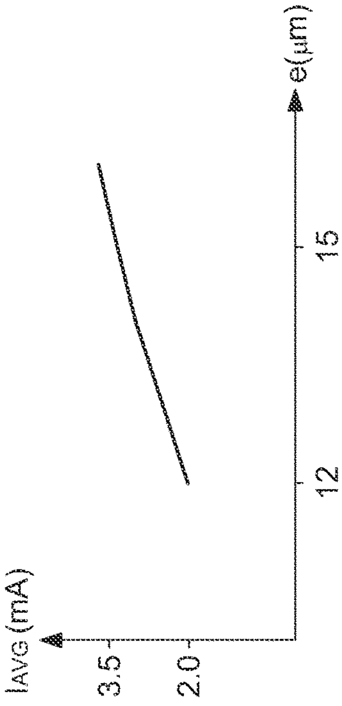
FIG. 13 is a curve showing the influence of the thickness of the coil wire (abscissa) on the current in the light-emitting diodes (ordinate)
Figure 14:
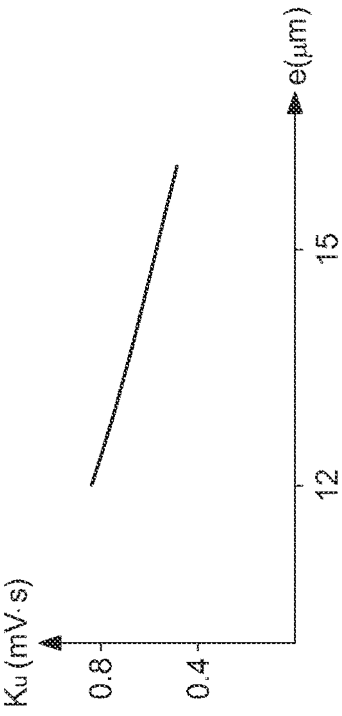
FIG. 14 is a curve showing the influence of the thickness of the coil wire (abscissa) on the induced voltage (ordinate)

What counts for the rotation frequency of the microgenerator is the average current $i_{LED\ AVG}$, shown in FIG. 10, flowing through the two light-emitting diodes; this results in an average braking torque $C_{MFR}$ applied to the rotor as shown in FIG. 11. It should be noted that in the case of an alternative embodiment in which provision is made for an indirect power supply to the light-emitting diodes and which comprises an electrical and/or electronic circuit without any substantial electrical energy storage component, this circuit can easily be configured to consume very little electrical energy relative to the light-emitting diodes, so that its impact is low or even insignificant. In particular, such a circuit can be composed exclusively of passive elements. In any case, an electrical and/or electronic circuit for managing the power supply to the light-emitting diodes consumes a small current, which is substantially constant, resulting in an offset in the graph in FIG. 10 when the total current, including that of this circuit, is considered. Similarly, there is a small offset in the graph in FIG. 11. Moreover, even if the consumption of the electrical and/or electronic circuit were to increase somewhat when the threshold voltage of the light-emitting diodes is exceeded and the circuit is then passed through by a stronger electric current, there would be a small offset above this threshold voltage, and thus within the functional range for regulating the microgenerator. Such an offset does not change the regulation principle, as the electrical energy consumption curve retains a profile similar to that shown in FIG. 11, allowing for the regulation provided for in the context of the invention.

In one particular example, the barrel initially outputs a maximum torque of 20 μN·m to the rotor, and an initial rotation frequency of this rotor equal to approximately 120 Hz is obtained, which gradually slows as the barrel is discharged, in particular down to approximately 100 Hz, roughly corresponding to a minimum torque of 12 μN·m supplied to the rotor, the minimum torque and the maximum torque corresponding to a useful range of the motor torque of the barrel for correct operation of the driven mechanism. Without the power dissipated by the light-emitting diodes (LEDs), the assembly would rotate much faster. With regard to the voltage induced in the coils, if: Ku is the induced voltage coefficient for a coil (maximum value of the induced voltage in a coil), $n_{BOB}$ is the number of coils, and w is the rotation frequency (rad/s), and considering that all of the coils are alternated in series, the induced voltage is $V_{IND}$:

$$V_{IND} = \omega \cdot n_{BOB} \cdot K_U \cdot \sin(\omega \cdot n_{BOB} \cdot t/2)$$

The electrical pulsation is equal to $n_{BOB}/2$ multiplied by the rotation frequency ω, because the induced voltage is the derivative of the variation in magnetic flux, which changes a first time from + to − and the next time from − to +. The induced voltage is thus a linear function of the rotation frequency.

The relationship between induced voltage and current in the light-emitting diode is theoretically given by the Shockley equation, where Vt is 26 mV at room temperature and n is a quality parameter between 1 and 2:$1=I_S\cdot(e^{VIND/nVt}-1)$. A good approximation is given by FIG. 6: the diode is reverse-biased at negative and low voltages, and is forward-biased above the threshold voltage Us, the characteristic curve $I_D=f(U_D)$ shows the strong increase in current in the LED, which is substantially linear above the threshold voltage Us, and it can be seen that small increases in voltage above the threshold value Us produce large increases in current, and consequent dissipation of energy. This approximation is very close to the actual behaviour of the LED given by Shockley's equation above.

The dimensions of the magnets and coils are optimised, as shown in FIG. 5, for a relatively small stator cage, with an external diameter of 8.4 mm and a total thickness excluding the hub of only 1.4 mm.

Figure 15:
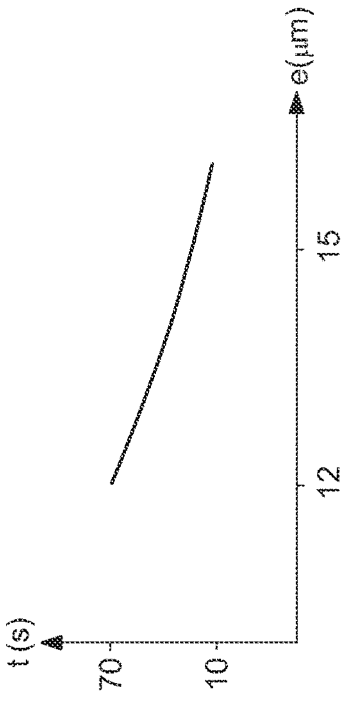
FIG. 15 is a curve showing the influence of the thickness of the coil wire (abscissa) on the total discharge time of the barrel (ordinate)

The number of turns and the diameter of the wire are adapted to ensure operation of the light-emitting diodes. A different number of coils, magnets and different dimensions are also possible. Increasing the volume of the magnets 25, or reducing the air gap, allows the coupling between the coils 11 and the magnets 25 to be increased. To maximise flux variations, the magnets 25 and the coils 11 are placed as close together as possible. Increasing the volume of the coils 11 or reducing the diameter of the wire allows the induced voltage coefficient Ku (defined as the ratio of the induced voltage to the rotation frequency) to be increased, but also increases the resistance of the coil. In this case, the intensity of the current in the light-emitting diodes is reduced, but the rotation frequency of the rotor is also reduced, thus increasing the barrel discharge time and the illumination time. FIGS. 12 to 15 show the effects of the thickness of the wire of the coil 11 on the resistance (FIG. 12), on the current in the diodes (FIG. 13), on the induced voltage (FIG. 13), and on the total discharge time of the barrel (FIG. 15).

Choosing a wire diameter of 14 μm thus gives a rotor frequency of 120 revolutions per second, with the barrel charged, which, with a power reserve of around 5,500 revolutions relative to the rotor, gives an operating time of more than 40 seconds.

According to a particular feature, the timepiece 2000 includes a device for releasing and stopping the microgenerator 100 which comprises, on the one hand, a control device 400 which can be actuated by a user to at least trigger and preferably also subsequently stop the driving of the rotor 10 of the microgenerator 100, the control device 400 including an external control member, in particular a push-button or a bolt equipped with a bolt spring, and on the other hand an engagement mechanism 500 which can be actuated by the movement 600 included in the timepiece 2000, for example to strike the time or produce a melody on request or at given times.

Figure 17:
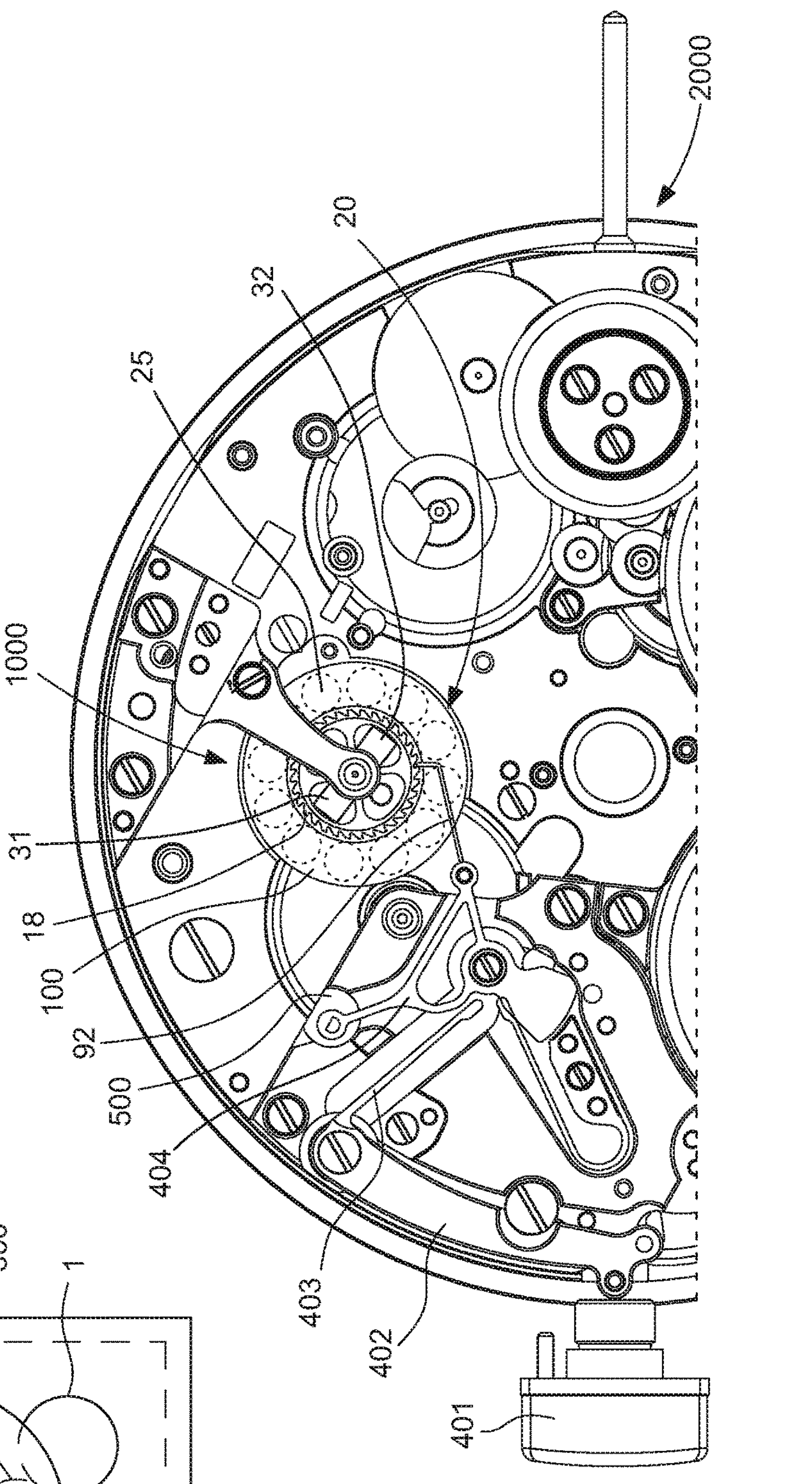
FIG. 17 shows, in part, a timepiece which includes a device for releasing and stopping the microgenerator associated with a push-button control device which can be operated by a user to trigger the driving or stopping of the rotor of the microgenerator.
Figure 16:
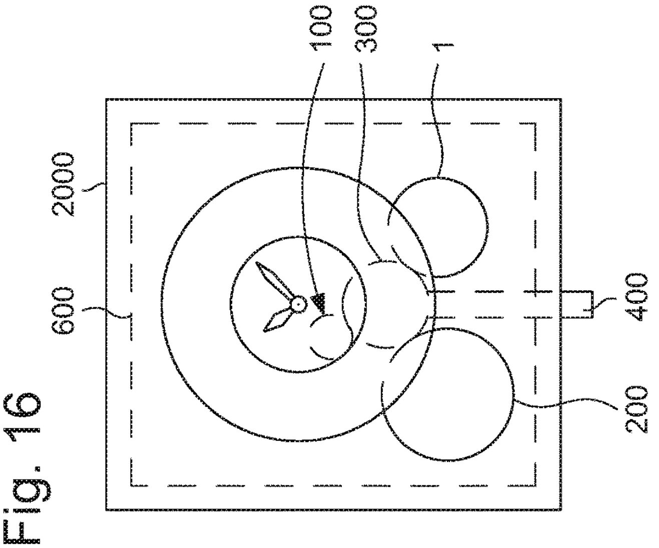
FIG. 16 diagrammatically shows a timepiece according to a general embodiment of the invention.

In an alternative embodiment illustrated by FIG. 17, the user can release the rotating wheel set, the rotor 10 and the microgenerator 100, in particular, by pressing a push-button 401 actuating a lever 402, acting on an actuating arm 403, and a resilient element 404 controlling the click 92 included in the release and stop device and which can be actuated by the actuating arm 403 and automatically by an engagement mechanism 500 driven by the movement. The rotation continues until the push-button is released or for a set period of time. The engagement mechanism 500 actuated by the horological movement 600 acts on the resilient element 404, in particular for an alarm function, preferably during a specific time interval. Any similar system can be devised to control the rotation and stopping of the rotating wheel set 1 on command. In particular, the various mechanisms provided are arranged to momentarily release the click 92 from the ratchet 18 of the rotor 10, and thus authorize rotation of the rotor 10 of the microgenerator 100 on demand, allowing the rotating wheel set to be driven.

It should be noted that the most sophisticated repeater and/or striking mechanisms include safety devices comprising levers referred to as isolators which allow the entire melody or sound display to be played, and prevent any operation by the user during this time, or any other control by the timepiece itself. The energy stored for this purpose, in a striking barrel or bolt spring or the like, is greater than the energy required to play the sound range lasting the longest.

More particularly, the release and stop device includes a mechanical delay device to limit the duration of rotation of the rotor 10.

According to a particular feature, the timepiece 2000 includes a specific zone that can be illuminated directly or indirectly by at least one light-emitting diode 31, 32, when the latter is emitting light.

According to a particular feature, the timepiece 2000 includes an acoustic animation mechanism which is a striking or repetition or musical animation mechanism comprising the rotating wheel set 1 whose speed of rotation is regulated by the regulating device 1000.

According to a particular feature, the timepiece 2000 includes a visual animation mechanism comprising the rotating wheel set 1, the speed of rotation of which is regulated by the regulating device 1000.

More particularly, at least one light-emitting diode 31, 32, synchronously emits light towards a given zone during an acoustic animation or visual animation sequence of the timepiece 2000. It can specifically illuminate one or more particular zones of the mechanism, or a visual animation, or a particular decorative element of the watch such as a stained glass decoration, musical notes, or the like.

According to a particular feature, the timepiece 2000 has no electrical energy storage capacitor.

The invention further relates to a method for regulating the speed of rotation of a rotating wheel set 1 of a timepiece 2000, in a functional speed range of the rotating wheel set 1 between a minimum speed $V_{min}$ and a maximum speed $V_{max}$ that is strictly greater than the minimum speed, the rotating wheel set 1 being driven by a motor device, in particular a barrel 200 included in the timepiece 2000.

This method uses a device 1000 for regulating the speed of rotation of the rotating wheel set 1, this regulating device 1000 including a microgenerator 100 which includes a rotor 10 mechanically coupled to the rotating wheel set 1, this rotor being movable about an axis of rotation D relative to a stator 20 carrying permanent magnets 25 or coils, the rotor carrying coils 11 or permanent magnets respectively, the coils 11 being connected, directly or indirectly, to at least one light-emitting diode 31, 32.

According to the invention, the features of the microgenerator 100 and of the at least one light-emitting diode 31, 32 are determined together with, where appropriate, the electrical and/or electronic circuit without any substantial electrical energy storage component, which constitute the only device consuming the electrical energy produced by the microgenerator, and the reduction of the regulating device 1000 between the rotating wheel set 1 and the rotor 10 in such a way that, for the functional speed range of the rotating wheel set 1, the corresponding frequency range of the rotation of the rotor 10, between a minimum frequency $F_{min}$ and a maximum frequency $F_{max}$, generates in the coils 11 an induced voltage range whose maximum voltage value $U_{max}$ for the maximum frequency $F_{max}$ is greater than a threshold voltage Us of the at least one light-emitting diode 31, 32. Moreover, the motor device is selected so that its useful motor torque range has a minimum torque $C_{MotMin}$ driving the rotating wheel set 1 at the minimum speed of the functional speed range, and a maximum torque $C_{MotMax}$ driving the rotating wheel set 1 at the maximum speed of the functional speed range. Preferably, said induced voltage range is located within a functional voltage range of said at least one light-emitting diode 31, 32, i.e. within a voltage range above the threshold voltage Us so that said at least one light-emitting diode produces light throughout the relevant induced voltage range in normal operation, allowing effective regulation throughout the intended operating range.

More particularly, the regulating device 1000 is designed to control the rotation frequency of the rotor 10 by maintaining it in the frequency range between the minimum frequency $F_{min}$ and the maximum frequency $F_{max}$, for a useful torque range of the motor device, between a minimum motor torque $C_{MotMin}$ and a maximum motor torque $C_{MotMax}$. Moreover, the minimum voltage value $U_{min}$ for the minimum frequency $F_{min}$ is provided above said threshold voltage Us.

More particularly, the regulating device 1000 is arranged so as not to include any means of dissipating the kinetic energy of the rotor 10 of the microgenerator 100. It is understood that the invention does not brake the rotor in order to reduce its frequency, but only to prevent its frequency from increasing.

More particularly still, the motor device is equipped with a barrel 200 dimensioned so that the useful range of the torque which it outputs, between the minimum motor torque $C_{MotMin}$ and the maximum motor torque $C_{MotMax}$, is such that the minimum motor torque $C_{MotMin}$ is equal to the sum of a mechanical torque $C_{MecVmin}$ required to drive the mechanism driven by the barrel, with the exception of the rotor 10 of the microgenerator 100, with the rotating wheel set 1 rotating at the minimum speed $V_{min}$, on the one hand, and a minimum rotor drive torque $C_{EDmin}$ corresponding to the minimum frequency $F_{min}$ of the rotor 10, on the other hand, and such that the maximum motor torque $C_{MotMax}$ is equal to the sum of a mechanical torque $C_{MecVmax}$ required to drive the mechanism, with the exception of the rotor 10 of the microgenerator 100, with the rotating wheel set 1 rotating at the maximum speed $V_{max}$, on the one hand, and to a maximum rotor drive torque $C_{EDmax}$ corresponding to the maximum frequency $F_{max}$ of the rotor, on the other hand.

Figure 7:
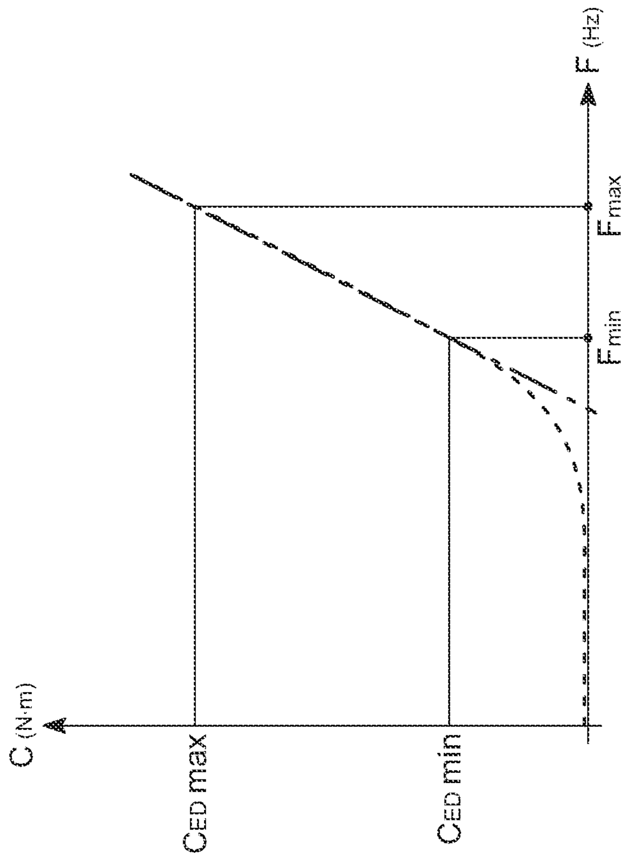
FIG. 7 is a graph representing the dissipation of electrical energy in the regulating device according to the invention, with the rotor drive torque on the ordinate as a function of the rotor frequency on the abscissa, this drive torque lying between a minimum value, corresponding to a minimum expected rotor frequency for a functional torque range, and a maximum value corresponding to a maximum expected rotor frequency; the characteristic of the rotor drive torque as a function of rotor frequency is substantially linear in the selected range. In short, the abscissa between the minimum and maximum rotor frequencies shows an "accepted" range of rotor frequencies for a speed of rotation of the rotating wheel set within its operating range; and the ordinate, between the minimum drive torque and the maximum drive torque, shows a range of torque dissipated by the LEDs which corresponds to a variation in rotor drive torque provided for the functional torque range, which makes it possible to regulate the rotation frequency of the rotor in the presence of a variable motor torque so as to maintain this frequency within a relatively restricted range.

More particularly, the one or more light-emitting diodes 31, 32 are chosen in such a number that, depending on their type and size, all of the light-emitting diodes 31, 32 included in the regulating device 1000 are arranged to dissipate electricity with a rotor drive torque between the minimum rotor drive torque $C_{EDmin}$, corresponding to the minimum frequency $F_{min}$, and the maximum rotor drive torque $C_{EDmax}$, corresponding to the maximum frequency $F_{max}$, as shown in FIG. 7.

According to a particular alternative embodiment, the at least one light-emitting diode 31, 32 is powered indirectly by the microgenerator 100, and the at least one light-emitting diode 31, 32 is connected to the microgenerator 100 via an electrical and/or electronic circuit without any substantial component for storing an electric current induced in the coils 11 when the rotor 10 of the microgenerator 100 is rotating.

In short, the invention implements passive regulation, requiring no electronic circuit for data processing and regulation control. Powering LEDs directly or indirectly via an electrical/electronic circuit without any substantial electrical energy storage component by means of a microgenerator for a device for regulating the speed of rotation of a wheel set is a novel concept, which makes it possible to combine high efficiency, a good degree of compactness, a low number of components and a low cost. Moreover, such a device makes it possible to obtain a robust and relatively high-end arrangement, suitable for high-end watchmaking.

The invention also makes it possible to do away with moving mechanical components that are fragile and subject to wear, such as those used in inertial governors, aerodynamic governors or eddy current governors. Mechanical return means such as springs are also no longer necessary.

The invention has many advantages.

The arrangement of the light-emitting diodes directly on the microgenerator means that there is no need for rubbing contacts, conducting wires or PCB tracks. This ensures compatibility with high-end watchmaking. Their advantageous arrangement on the rotor avoids the presence of any electronic components made of materials that are not compatible with a high-end mechanical watch. In the preferred alternative embodiment, the light-emitting diodes are thus the only components that can be described as "electronic", but their composition is inorganic and the vast majority of the volume is composed of crystal and metal. As a result, the proposed arrangement is aesthetically discreet and also compatible with the construction of a skeleton watch with an exposed system. In the advantageous alternative embodiment with an indirect power supply to the light-emitting diodes, in which an electrical and/or electronic circuit is provided without any substantial electric current storage component, it is also possible to have essentially only crystal, in particular silicon and metal, and to procure a very long service life for the "electronic" type elements. This alternative embodiment is thus also suitable for high-end watchmaking for meticulous mechanical movements.

One or more light-emitting diodes can be powered without the need for a primary cell or battery. It goes without saying that a levelling capacitor mounted on the rotor can be used, but this does not seem necessary because the rotor rotates at a relatively high frequency, thus preventing the periodic variation in brightness from being perceptible to the human eye when the LED illumination function is used to illuminate a visible part of the timepiece. In fact, the preferred embodiment of the invention has the advantage of having a passive circuit without any intermediate energy storage, thanks to each diode being directly powered by the coils, without necessarily requiring an induced voltage rectifier or levelling capacitor.

The possibility of activating a luminous function, coupled with another function linked to the rotation of the rotating wheel set 1, and of stopping it after a set time is highly advantageous. This option is not available in watches known in the prior art. It is thus possible to have an additional illumination function, for example to illuminate a dial, or a wheel set visible to the user, or other element, during the rotation of the rotating wheel set.

The light-emitting diode does not have any persistent luminosity when the current is switched off; however, the user's eye sees persistent illumination because, with a rotation in the order of a hundred Hertz and, for example, 12 or 14 poles in the microgenerator, flickering occurs in the order of one kHz, which is imperceptible to the eye. As regards the rotation of the microgenerator, small braking torques occurring a thousand times a second will level the rotation frequency. An energy storage capacitor is not desirable, as it would not have a voltage variation that would follow the induced voltage variation quickly enough, and would thus not be very effective at regulating speed. When the light-emitting diodes (LEDs) rotate at a high frequency, they generate an annular light distribution that is almost continuous and uniform for the human eye, and whose surface extension is much greater than that of a light-emitting diode.

The solution, which uses no electronics other than a (passive) Graetz bridge mounted on the rotor, and no electrical energy accumulator, guarantees full compatibility with high-end watchmaking applications.

The invention claimed is:

1. A timepiece (2000) comprising a rotating wheel set (1), a motor device (200) arranged to be able to drive the rotating wheel set, and a regulating device (1000) for regulating the speed of rotation of the rotating wheel set, the regulating device including a microgenerator (100) which includes a stator (20) and a rotor (10) mechanically coupled to the rotating wheel set (1), the stator (20) carrying permanent magnets (25) or coils and the rotor carrying coils (11) or permanent magnets respectively, wherein the regulating device further comprises at least one light-emitting diode (31, 32) which is powered, directly or indirectly, by the microgenerator, wherein, in the case of said at least one light-emitting diode being indirectly powered by the microgenerator, said at least one light-emitting diode is connected to the microgenerator via an electrical and/or electronic circuit with no electrical energy storage component, wherein the microgenerator (100) and said at least one light-emitting diode are arranged in such a way that, for a functional speed range of the rotating wheel set between a minimum speed (Vmin) and a maximum speed (Vmax) that is strictly greater than the minimum speed, the corresponding frequency range of the rotation of the rotor (10), between a minimum frequency (Fmin) and a maximum frequency (Fmax), generates, in the coils (11), a range of induced voltage whose maximum induced voltage value, occurring for said maximum frequency (Fmax), is greater than a threshold voltage (Us) of said at least one light-emitting diode (31, 32), and wherein said at least one light-emitting diode and said electrical and/or electronic circuit constitute the only electrical energy-consuming device incorporated in the regulating device, the motor device being arranged in such a way that it has a useful motor torque range allowing the rotating wheel set to be driven substantially within said functional speed range.

2. The timepiece (2000) according to claim 1, wherein the minimum induced voltage value, occurring for said minimum frequency (Fmin), of said induced voltage range is also greater than the threshold voltage (Us) of said at least one light-emitting diode (31, 32).

3. The timepiece (2000) according to claim 1, wherein the regulating device does not include any means for dissipating the kinetic energy of the rotor (10) of the microgenerator (100).

4. The timepiece (2000) according to claim 1, wherein the motor device is arranged so that its useful motor torque range has a minimum torque (CMotMin), driving the rotating wheel set (1) at said minimum speed (Vmin) of the functional speed range, and a maximum torque (CMotMax) driving the rotating wheel set at said maximum speed (Vmax) of the functional speed range.

5. The timepiece (2000) according to claim 4, wherein the regulating device (1000) regulates the frequency of rotation of the rotor (10) by maintaining it in said frequency range, between the minimum frequency (Fmin) and the maximum frequency (Fmax), for the useful torque range of the motor device between the minimum motor torque (CMotMin) and the maximum motor torque (CMotMax).

6. The timepiece (2000) according to claim 5, wherein said motor device is formed by a barrel (200) which is dedicated to driving a mechanism comprising the rotating wheel set (1) and dimensioned so that the useful range of the torque which it outputs, between the minimum motor torque (CMotMin) and the maximum motor torque (CMotMax), is such that the minimum motor torque (CMotMin) is equal to the sum of a mechanical torque (CMecVmin) required to drive the mechanism, with the exception of the rotor (10) of the microgenerator (100), with the rotating wheel set (1) rotating at the minimum speed (Vmin), on the one hand, and a minimum rotor drive torque (CEDmin) corresponding to the minimum frequency (Fmin) of the rotor (10), on the other hand, and such that the maximum motor torque (CMotMax) is equal to the sum of a mechanical torque (CMecVmax) required to drive the mechanism, with the exception of the rotor (10) of the microgenerator (100), with the rotating wheel set (1) rotating at the maximum speed (Vmax), on the one hand, and to a maximum rotor drive torque (CEDmax) corresponding to the maximum frequency (Fmax) of the rotor, on the other hand.

7. The timepiece (2000) according to claim 6, wherein said regulating device (1000) includes one light-emitting diode (31, 32) or several light-emitting diodes (31, 32) in such a number that, according to their type and size, all of the light-emitting diodes (31, 32) included in the regulating device (1000) are arranged to dissipate electrical energy with a drive torque of the rotor (10) between the minimum rotor drive torque (CEDmin), corresponding to the minimum frequency (Fmin) of the rotor, and the maximum rotor drive torque (CEDmax) corresponding to the maximum frequency (Fmax) of the rotor (10).

8. The timepiece (2000) according to claim 1, wherein at least one light-emitting diode (31, 32) is powered indirectly, via a Graetz bridge rectifier forming the one and only electrical and/or electronic circuit, by at least one coil (11) supplying an electric current induced during the rotation of the rotor relative to the stator (20) of the microgenerator (100).

9. The timepiece (2000) according to claim 1, wherein at least one light-emitting diode (31, 32) is powered directly by at least one coil (11) as it rotates relative to the stator (20) of the microgenerator (100).

10. The timepiece (2000) according to claim 1, wherein the stator (20) carries the permanent magnets (25), and the rotor (10) carries the coils (11); and wherein each said light-emitting diode (31, 32) is mounted on said rotor (10).

11. The timepiece (2000) according to claim 10, wherein the permanent magnets (25) are located, when projected axially, inside a circular surface defined by the rotor (10) when it is rotating.

12. The timepiece (2000) according to claim 10, wherein the rotor (10) carries at least one pair of light-emitting diodes (31, 32), which are preferably diametrically opposed and arranged in reverse polarity to one another.

13. The timepiece (2000) according to claim 10, wherein the regulating device (1000) includes, in the vicinity of the microgenerator (100), at least one stationary light-guiding structure arranged to collect, for any angular position of the rotor (10) when the latter is rotating, at least a major part of the light emitted by at least one light-emitting diode (31, 32) and to then guide the emitted light towards at least one visible part of the timepiece, so as to obtain a substantially constant and/or substantially uniform illumination of the visible part when the at least one light-emitting diode is emitting.

14. The timepiece (2000) according to claim 1, wherein any electrical and/or electronic equipment included in the timepiece is an element of the microgenerator (100).

15. The timepiece (2000) according to claim 10, wherein any electrical and/or electronic circuit which the timepiece comprises is mounted on the rotor (10) of the microgenerator (100).

16. The timepiece (2000) according to claim 14, wherein any electrical and/or electronic circuit which the timepiece comprises is mounted on the rotor (10) of the microgenerator (100).

17. The timepiece (2000) according to claim 1, wherein the timepiece includes a device for releasing and stopping said microgenerator (100) which comprises either a control device (400) which can be actuated by a user to trigger the driving of the rotor (10) of the microgenerator (100), said control device (400) including a control member and/or a push-button and/or a bolt equipped with a bolt spring, or an engagement mechanism which can be actuated by a mechanism (600) included in said timepiece (2000).

18. The timepiece (2000) according to claim 17, wherein the rotor (10) includes a ratchet (18), and the release and stop device comprises a click (92) cooperating with the ratchet (18) to trigger the rotation of the microgenerator (100) on demand.

19. The timepiece (2000) according to claim 17, wherein the release and stop device includes a mechanical delay device for limiting the duration of rotation of the rotor (10).

20. The timepiece (2000) according to claim 1, wherein the timepiece includes a specific zone which can be illuminated directly or indirectly by at least one light-emitting diode (31, 32) when the latter is emitting light.

21. The timepiece (2000) according to claim 1, wherein the timepiece includes an acoustic animation mechanism which is a striking or repeating or musical animation mechanism including the rotating wheel set (1) whose speed of rotation is regulated by the regulating device (1000).

22. The timepiece (2000) according to claim 1, wherein the timepiece includes a visual animation mechanism including the rotating wheel set (1), the speed of rotation of which is regulated by the regulating device (1000).

23. The timepiece (2000) according to claim 20, wherein at least one light-emitting diode (31, 32) emits light towards a determined zone during an acoustic animation or visual animation sequence of the timepiece (2000).

24. The timepiece (2000) according to claim 1, wherein the regulating device has no electrical energy storage capacitor.

25. A method for regulating the speed of rotation of a rotating wheel set (1) of a timepiece (2000), in a functional speed range of the rotating wheel set (1) between a minimum speed (Vmin) and a maximum speed (Vmax) that is strictly greater than the minimum speed, the rotating wheel set (1) being driven by a motor device (200) included in the timepiece (2000), the method implementing a device (1000) for regulating the speed of rotation of the rotating wheel set (1) which is formed by a microgenerator (100) comprising a rotor (10) mechanically coupled to the rotating wheel set (1), the rotor being movable about an axis of rotation (D) relative to a stator (20) carrying permanent magnets (25) or coils, the rotor carrying coils (11) or permanent magnets respectively; wherein the coils (11) are connected, directly or indirectly, to at least one light-emitting diode (31, 32), wherein the features of the microgenerator (100) and of said at least one light-emitting diode (31, 32), which together with an electrical and/or electronic circuit with no electric current storage component arranged between the coils, constitute the only device consuming electrical energy and reducing the ratio of the regulating device (1000) between the rotating wheel set (1) and the rotor (10), are determined in such a way that, for the functional speed range of the rotating wheel set (1), the corresponding frequency range of the rotation of the rotor (10), between a minimum frequency (Fmin) and a maximum frequency (Fmax), generates in the coils an induced voltage range whose maximum induced voltage value, occurring for said maximum frequency (Fmax), is greater than a threshold voltage (Us) of said at least one light-emitting diode (31, 32), and wherein the motor device (200) is arranged so that its useful motor torque range has a minimum torque (CMotMin) driving the rotating wheel set (1) at said minimum speed of the functional speed range, and a maximum torque (CMotMax) driving the rotating wheel set (1) at the maximum speed of the functional speed range.

26. The regulation method according to claim 25, wherein the minimum induced voltage value, occurring for said minimum frequency (Fmin), of said induced voltage range is also greater than the threshold voltage (Us) of said at least one light-emitting diode (31, 32).

27. The regulation method according to claim 25, wherein the regulating device (1000) is designed to regulate the rotation frequency of the rotor (10) by maintaining it in said frequency range, between the minimum frequency (Fmin) and the maximum frequency (Fmax), for a useful torque range of the motor device, between a minimum motor torque (CMotMin) and a maximum motor torque (CMotMax).

28. The regulation method according to claim 25, wherein the regulating device is arranged so as not to include any means of dissipating the kinetic energy of the rotor (10) of the microgenerator (100).

29. The regulation method according to claim 25, wherein the motor device is equipped with a barrel (200) dimensioned so that the useful range of the torque which it outputs, between the minimum motor torque (CMotMin) and the maximum motor torque (CMotMax), is such that the minimum motor torque (CMotMin) is equal to the sum of a mechanical torque (CMecVmin) required to drive the mechanism, with the exception of the rotor (10) of the microgenerator (100), with the rotating wheel set (1) rotating at the minimum speed (Vmin), on the one hand, and a minimum rotor drive torque (CEDmin) corresponding to the minimum frequency (Fmin) of the rotor (10) on the other hand, and such that the maximum motor torque (CMotMax) is equal to the sum of a mechanical torque (CMecVmax) required to drive the mechanism, with the exception of the rotor (10) of the microgenerator (100), with the rotating wheel set (1) rotating at the maximum speed (Vmax), on the one hand, and to a maximum rotor drive torque (CEDmax) corresponding to the maximum frequency (Fmax) of the rotor, on the other hand.

30. The regulation method according to claim 29, wherein the light-emitting diode (31, 32) or several light-emitting diodes (31, 32) are chosen in such a number that, depending on their type and size, all of the light-emitting diodes (31, 32) included in the regulating device (1000) are arranged to dissipate electricity with a rotor drive torque between the minimum rotor drive torque (CEDmin), corresponding to the minimum frequency (Fmin), and the maximum rotor drive torque (CEDmax) corresponding to the maximum frequency (Fmax).

31. The regulation method according to claim 25, wherein an indirect powering of said at least one light-emitting diode (31, 32) by the microgenerator (100) is chosen, and wherein said at least one light-emitting diode (31, 32) is connected to the microgenerator (100) via an electrical and/or electronic circuit with no component for storing an electric current induced in the coils (11) when the rotor (10) of the microgenerator (100) is rotating.

* * * * *